(12) United States Patent
Azzini et al.

(10) Patent No.: US 12,467,523 B2
(45) Date of Patent: Nov. 11, 2025

(54) COATING FOR A TRIBOLOGICAL SURFACE OF A COMPONENT

(71) Applicant: GE Avio S.r.l., Rivalta di Torino (IT)

(72) Inventors: Lucia Azzini, Turin (IT); Fabio De Bellis, Turin (IT); Andrea Piazza, Turin (IT)

(73) Assignee: GE Avio S.r.l., Rivalta di Torino (IT)

( * ) Notice: Subject to any disclaimer, the term of this patent is extended or adjusted under 35 U.S.C. 154(b) by 458 days.

(21) Appl. No.: 17/488,784

(22) Filed: Sep. 29, 2021

(65) Prior Publication Data

US 2022/0364636 A1    Nov. 17, 2022

(30) Foreign Application Priority Data

May 13, 2021    (IT) .................. 102021000012398

(51) Int. Cl.

| | |
|---|---|
| F16H 55/06 | (2006.01) |
| C23C 14/06 | (2006.01) |
| C23C 16/26 | (2006.01) |
| C23C 16/30 | (2006.01) |
| C23C 16/34 | (2006.01) |
| C23C 16/50 | (2006.01) |
| C23C 24/04 | (2006.01) |
| C23C 28/04 | (2006.01) |
| F02C 7/36 | (2006.01) |
| F16H 1/28 | (2006.01) |
| F16H 57/08 | (2006.01) |

(52) U.S. Cl.
CPC ......... *F16H 55/06* (2013.01); *C23C 14/0688* (2013.01); *C23C 16/26* (2013.01); *C23C 16/303* (2013.01); *C23C 16/34* (2013.01); *C23C 16/50* (2013.01); *C23C 24/04* (2013.01); *C23C 28/044* (2013.01); *F02C 7/36* (2013.01); *F05D 2220/32* (2013.01)

(58) Field of Classification Search
None
See application file for complete search history.

(56) References Cited

U.S. PATENT DOCUMENTS

| | | |
|---|---|---|
| 3,286,737 A | 11/1966 | Kelly, Jr. |
| 3,479,289 A | 11/1969 | Van Wyk |
| (Continued) | | |

FOREIGN PATENT DOCUMENTS

| | | |
|---|---|---|
| CN | 102348887 A | 2/2012 |
| CN | 102994947 B | 12/2014 |
| (Continued) | | |

OTHER PUBLICATIONS

Brzezinka et al., DLC and DLC-WS2 Coatings for Machining of Aluminum Alloys, MDPI Journal Coatings, vol. 9, No. 3, 2019, p. 192. https://www.mdpi.com/2079-6412/9/3/192 https://doi.org/10.3390/coatings9030192.

(Continued)

*Primary Examiner* — David Sample
(74) *Attorney, Agent, or Firm* — Dority & Manning, P.A.

(57) ABSTRACT

A component includes a metallic substrate having a tribological surface and a coating. The coating includes a first layer disposed on the tribological surface and a second layer disposed on the first layer. The first layer includes titanium, chromium, or a diamond-like carbon (DLC). The second layer includes a disulfide.

8 Claims, 3 Drawing Sheets

(56) References Cited

U.S. PATENT DOCUMENTS

| | | | |
|---|---|---|---|
| 3,497,376 | A | 2/1970 | Wieser |
| 3,637,497 | A | 1/1972 | Fitz Simmons |
| 3,837,497 | A | 9/1974 | Smith |
| 4,414,241 | A * | 11/1983 | Quella ................ F16C 33/6696 |
| | | | 427/418 |
| 5,230,815 | A | 7/1993 | Rountree |
| 6,170,156 | B1 | 1/2001 | Lev et al. |
| 6,180,574 | B1 | 1/2001 | Ryan et al. |
| 6,183,716 | B1 | 2/2001 | Sleight et al. |
| 6,432,022 | B1 | 8/2002 | Bayer |
| 6,513,986 | B2 | 2/2003 | Ito et al. |
| 6,977,096 | B2 | 12/2005 | LeClaire |
| 8,530,051 | B2 | 9/2013 | Yamaguchi et al. |
| 8,904,642 | B2 | 12/2014 | Hanna et al. |
| 9,029,302 | B2 | 5/2015 | Kamiya et al. |
| 9,366,333 | B2 | 6/2016 | Tsuda et al. |
| 9,625,332 | B2 | 4/2017 | Saito et al. |
| 10,253,817 | B2 | 4/2019 | Plogmann et al. |
| 10,578,169 | B2 | 3/2020 | Pritchard |
| 10,641,332 | B2 | 5/2020 | Nonato de Paula et al. |
| 2002/0151406 | A1 * | 10/2002 | Williams ............... F16D 13/648 |
| | | | 475/331 |
| 2007/0082547 | A1 | 4/2007 | Komoto et al. |
| 2010/0297440 | A1 | 11/2010 | Noll |
| 2018/0372151 | A1 | 12/2018 | Sridhar et al. |
| 2021/0060669 | A1 | 3/2021 | Stinnett |

FOREIGN PATENT DOCUMENTS

| | | | |
|---|---|---|---|
| CN | 110038776 A | | 7/2019 |
| DE | 19625892 A1 | | 1/1997 |
| DE | 10215881 A1 | | 10/2003 |
| DE | 102004051289 A1 | | 5/2006 |
| DE | 102006015997 A1 | | 10/2007 |
| DE | 102013211590 A1 | | 12/2014 |
| DE | 102019001018 A1 | | 8/2020 |
| JP | 2000002315 A * | | 1/2000 ........... F16H 57/041 |
| JP | 2005007912 A | | 1/2005 |
| JP | 2007291466 A | | 11/2007 |
| JP | 2019007059 A | | 1/2019 |
| KR | 101627208 A | | 12/2015 |
| WO | WO201820976 A1 | | 2/2018 |

OTHER PUBLICATIONS

IBC Coatings Technologies, DLC Coating, Diamond-Like Carbon Coating, CeraTough™-D, Diamond-Like Carbon (DLC). Retrieved Aug. 31, 2021 from web page: https://www.ibccoating.com/dlc-coating-diamond-like-carbon-coating-ceratough-d.

SKF, The Potential of Surface Refinement, Rolling Bearings. Retrieved Aug. 31, 2021 from web page: https://www.skf.com/uk/products/rolling-bearings/coatings.

Theiler et al., Friction and Endurance of $MoS_2$/ta-C Coatings Produced by Laser Arc Deposition, ScienceDirect Wear, vol. 297, Issues—1-2, Jan. 15, 2013, pp. 791-801. https://www.sciencedirect.com/science/article/abs/pii/S004316481200316X https://doi.org/10.1016/j.wear.2012.10.007.

Bouabibsa et al., "Structure, Mechanical and Tribological Properties of Me-Doper Diamond-Like Carbon (DLC) (Me=Al, Ti, or Nb) Hydrogenated Amorphous Carbon Coatings", Coatings, vol. 8, No. 10, Oct. 19, 2018, p. 370.

Burtch, Engineering Precisely Controlled Negative and Zero Thermal Expansion Behaviors in Metal-Organic Frameworks, SAND2019-10497, Sandia National Laboratories, 2019, 31 Pages.

Dedova et al., Structure and Thermal Behavior of Zirconium Tungstate Under Heating, IOP Conference Series Materials Science and Engineering, vol. 140, 2016, 8 Pages.

Liebendorfer, Molybdenum Lowers Negative Thermal Expansion of Zirconium Vandate to Room Temperature, AIP Scilight, May 2020, 6 Pages.

McCreary et al., Substrate Sensitivity of Monolayer WS2 Naval Research Laboratory, Washington, DC, 29 Pages.

Qi et al., "Thermal expansion control of composite coatings on 42CrMo by laser cladding", Surface & Coatings Technology, China, 2020, 9 Pages.

Raza et al., Structural, Fatigue Behavior, and Mechanical Properties of Zirconium Tungstate-Reinforced Casted A356 Aluminum Alloy, Metals 2020, vol. 10, Issue 11, 1492, 15 Pages.

Wikiversity, Gears, 4 Pages. Retrieved Dec. 7, 2021.

Zhang et al., Thermal Expansion Coefficient of Monolayer Molybdenum Disulfide Using Micro-Raman Spectroscopy, Nano Lett, vol. 19, Issue 7, Jul. 10, 2019, pp. 4745-4751. (Abstract Only).

* cited by examiner

COATING FOR A TRIBOLOGICAL SURFACE OF A COMPONENT

FEDERALLY SPONSORED RESEARCH

The project leading to this application has received funding from the Clean Sky 2 Joint Undertaking (JU) under grant agreement No 945583. The JU receives support from the European Union's Horizon 2020 research and innovation programme and the Clean Sky 2 JU members other than the Union.

PRIORITY INFORMATION

The present application claims priority to Italian Patent Application Number 102021000012398 filed on May 13, 2021.

FIELD

The present disclosure relates to a coating for a component. More specifically, the present disclosure relates to a coating for a tribological surface of a component having a metallic substrate.

BACKGROUND

Components, such as gears for a gearbox, can include tribological surfaces. These tribological surfaces can experience friction when the components are in motion, which generates heat. Specifically with respect to the gears of a gearbox for a gas turbine engine or rotorcraft, such as gears of a reduction gearbox of a gas turbine engine or rotorcraft, during oil interruption and oil-off operating conditions, the gears may experience high levels of friction, generating high amounts of heat. The inventors of the present disclosure have found that such may prematurely wear down the gears. As such, the inventors of the present disclosure have found that solutions to reduce the amount of friction experienced by the tribological surfaces of certain components would be welcomed in the art.

BRIEF DESCRIPTION

Aspects and advantages of the present disclosure will be set forth in part in the following description, or may be obvious from the description, or may be learned through practice of the present disclosure.

In one exemplary embodiment of the present disclosure, a component is provided. The component includes a metallic substrate having a tribological surface and a coating. The coating includes a first layer disposed on the tribological surface and a second layer disposed on the first layer. The first layer includes titanium, chromium, or a diamond-like carbon (DLC). The second layer includes a disulfide.

In another exemplary embodiment of the present disclosure, a method for depositing a coating onto a metallic substrate having a tribological surface is provided. The method includes depositing a first layer onto the tribological surface and depositing a second layer onto the first layer. The first layer includes titanium, chromium, or a DLC. The second layer includes a disulfide.

In another exemplary embodiment of the present disclosure, a gearbox is provided. The gearbox includes a first gear having a metallic substrate, a tribological surface, and a coating. The coating includes a disulfide.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
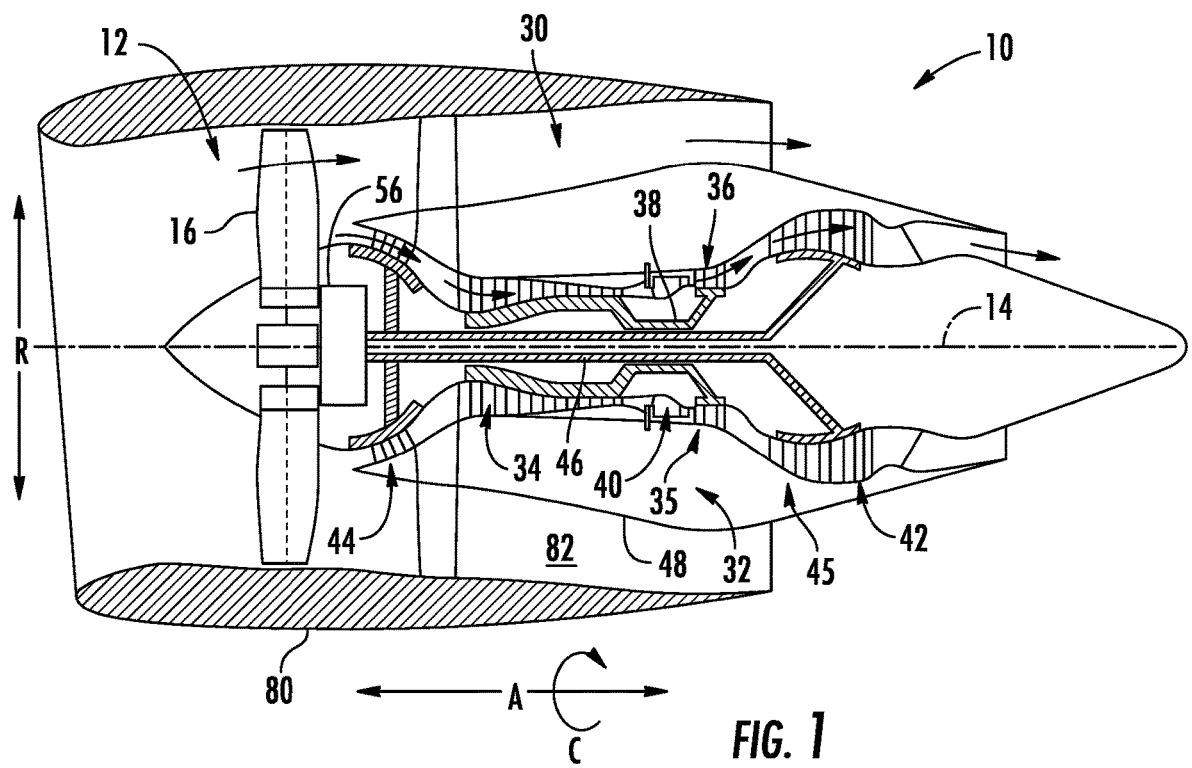
FIG. 1 is a cross-sectional view of a gas turbine engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a component includes a metallic substrate having a tribological surface. The component also includes a coating having a first layer and a second layer. The coating can reduce the amount of friction experienced by the tribological surface of the component, which reduces the amount of heat experienced by the tribological surface of the component.

In accordance with one or more embodiments described herein, the component can be a gear for a gearbox. Applying the coating onto a tribological surface of the gear can reduce the amount of friction experienced by the tribological surface of the component, which reduces the amount of heat experienced by the tribological surface of the component. Reducing the amount of heat or friction experienced by the tribological surface has several benefits.

For example, the amount of lubricant provided to the gear can be reduced. Reducing the amount of lubricant can allow for the reduction in size of the lubricant sump and the amount of lubricant stored on the gas turbine engine or aircraft of which it is installed. This can additionally result in a weight reduction of the engine.

Also, reducing the amount of heat or friction experienced by the tribological surface can increase the amount of time that a gas turbine engine can operate if it experiences a loss of lubricant scenario. Additionally, an emergency lubrication system may be unnecessary if the coating provides enough friction reduction to the gear during a loss of lubricant scenario. Not providing an emergency lubrication system can decrease the weight and cost of an engine.

Additionally, applying the coating on a tribological surface can allow for the use of substrate materials that are lighter, less expensive, and have shorter lead times than substrate materials that may be required if a coating is not applied to the tribological surface.

Referring now to the drawings, wherein identical numerals indicate the same elements throughout the figures, FIG. 1 is a cross-sectional view of a gas turbine engine in accordance with an exemplary embodiment of the present disclosure. In particular, the exemplary gas turbine engine of FIG. 1 is a configured as a single rotor, ducted engine 10 defining an axial direction A, a radial direction R, and a circumferential direction C (extending about the axial direction A). As is seen from FIG. 1, the engine 10 has a rotor assembly 12 (e.g., a fan assembly) that includes an array of rotor blades 16 arranged around the central axis 14.

Additionally, the engine 10 includes a turbomachine 30 having a core 32. The core 32 generally includes a high speed compressor 34, a high speed turbine 36, and a high speed shaft 38 extending therebetween and connecting the high speed compressor 34 and high speed turbine 36. The high speed compressor 34 (or at least the rotating components thereof), the high speed turbine 36 (or at least the rotating components thereof), and the high speed shaft 38 may collectively be referred to as a high speed spool 35 of the engine. Further, a combustion section 40 is located between the high speed compressor 34 and high speed turbine 36. The combustion section 40 may include one or more configurations for receiving a mixture of fuel and air and providing a flow of combustion gasses through the high speed turbine 36 for driving the high speed spool 35.

The low speed system similarly includes a low speed turbine 42, a low speed compressor 44, and a low speed shaft 46 extending therebetween and connecting the low speed compressor 44 and low speed turbine 42. The low speed compressor 44 (or at least the rotating components thereof), the low speed turbine 42 (or at least the rotating components thereof), and the low speed shaft 46 may collectively be referred to as a low speed spool 45 of the engine.

As is depicted, the rotor assembly 12 is driven by the turbomachine 30 and, more specifically, is driven by the low speed spool 45. More particularly, the engine 10 in the embodiment shown in FIG. 1 includes a reduction gearbox 56, more specifically, a power gearbox, and the rotor assembly 12 is driven by the low speed spool 45 of the turbomachine 30 across the reduction gearbox. The reduction gearbox provides torque from the turbomachine 30 to the rotor assembly 12 and may include a gearset, such as a planetary gearset, also known as an epicyclic gearset, for decreasing a rotational speed of the low speed spool 45 relative to the low speed turbine 42, such that the rotor assembly 12 may rotate at a slower rotational speed than the low speed spool 45. In such a manner, the rotating rotor blades 16 of the rotor assembly 12 may rotate around the central axis 14 and generate thrust to propel the engine 10, and hence an aircraft to which it is associated, in a forward direction.

Gearboxes for aerospace applications, such as reduction gearbox 56, power gearboxes, or rotorcraft gearboxes, can have high rotational speeds and torques, which generate a large amount of heat. This heat can be expelled through a lubricating system (not shown).

As further shown in FIG. 1, the exemplary engine 10 includes a nacelle 80 circumferentially surrounding at least in part the rotor assembly 12 and turbomachine 30. The nacelle 80 defines a bypass passage 82 radially outward of the turbomachine 30. That is, the bypass passage 82 is defined between the nacelle 80 and the cowl 48 encasing the turbomachine 30.

It will be appreciated, however, that the exemplary single rotor, ducted engine depicted in FIG. 1 is by way of example only, and in other exemplary embodiments, the engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be an unducted engine, a turbofan engine, a turboshaft engine, a turboprop engine, a turbojet engine, etc.

Figure 2:
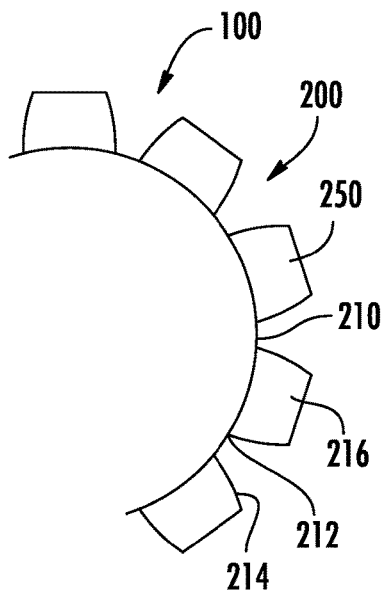
FIG. 2 is a partial, side-view of a prior art component.

FIG. 2 is a partial, side-view of a prior art component 100. The component 100 has a metallic substrate 210 having a surface 212, with a portion of the surface 212 being a tribological surface 214 and, for the embodiment depicted, a portion of the surface 212 being a non-tribological surface 216. A "tribological surface," such as tribological surface 214, is a portion of a surface of a component that is configured to contact another component in relative motion during operation. As will be appreciated from the description herein, a tribological surface may contact another component directly or through one or more intermediate layers or substances. Generally, tribological surfaces are relatively high-friction areas of the component. A "non-tribological surface" is a portion of a surface of a component that is not configured to contact another component (not shown) in relative motion during operation. Generally, non-tribological surfaces are relatively low-friction, or no friction, areas of the component.

In this example, the component 100 is a gear 200 for a gearbox, such as reduction gearbox 56 of engine 10. More specifically, the gear 200 is a spur gear. The tribological surface 214 is the portion of the gear 200 that makes contact with another gear (not shown) when operating. For example, the portions of the gear teeth 250 that make contact with gear teeth of another gear are tribological surfaces 214. The non-tribological surface 216 is the portion of the gear 200 that does not make contact with another gear when operating within a gearbox.

Some gearboxes, such as reduction gearbox 56 for gas turbine engine 10 or a reduction gearbox for a rotorcraft, operate at high rotational speeds and torques and can generate a large amount of heat that can be expelled through a lubricating system. These high rotational speeds and torques can require the manufacturing of certain components, such as gears, from high performance materials. These high-performance materials, such as X53 alloy steel and M50 alloy steel, can be expensive, heavy, and can have long material lead times. However, as will be explained below, a coating 220 (see FIGS. 3 through 5) can be applied to at least a portion of the gear 200 to allow the use of materials, such as 9310 alloy steel, that can be less expensive, lighter, and can have shorter material lead times, for high rotational speeds and torque gearbox applications.

Figure 3:
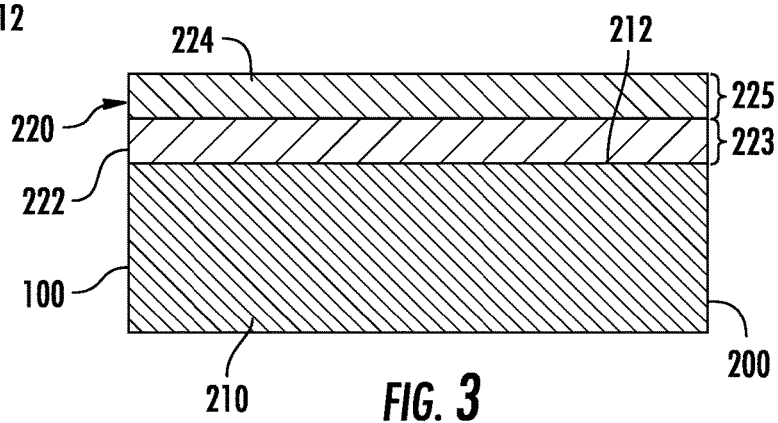
FIG. 3 is a cross-sectional, side view of a coating that can be disposed on a component in accordance with an exemplary embodiment of the present disclosure.

Referring now to FIG. 3, a cross-sectional, side view is provided of a component 100, such as a gear 200 (similar to the gear 200 of FIG. 2), having a metallic substrate 210 and including a coating 220 in accordance with an exemplary embodiment of the present disclosure. In this example, the coating 220 includes a first layer 222 that is disposed on a surface 212 of the metallic substrate 210 to a first thickness 223 and a second layer 224 that is disposed on the first layer 222 to a second thickness 225. The metallic substrate 210 can include a carburized or a nitrided steel. For example, the metallic substrate 210 can include 9310 alloy steel, X53 alloy steel, or M50 alloy steel, to name a few.

The first layer 222 can include titanium, chromium, or a diamond-like carbon (DLC). For example, the first layer 222 can be DLC, a metal-doped DLC (MeDLC), titanium nitride (TiN), chromium nitride (CrN), hard chromium, or thin dense chrome (TDC). When the first layer 222 is a MeDLC, the dopant can be, by way of example and not limitation, titanium (Ti), tungsten metal (W), molybdenum (Mo), silicon (Si), or chrome (Cr). The first layer 222 can increase the wear resistance and the hardness of the component. As such, materials that are lighter and softer can be used for certain applications where harder materials have been typically used, when the first layer 222 is applied to the material. For example, alloy steel 9310 can be used for applications where typically a harder steel, such as alloy steel X53, has been traditionally used, when the first layer 222, as described in the present disclosure, is applied. Using alloy steel 9310 in lieu of alloy steel X53 can result in lower material lead times, reduced weight, and lower costs.

The first layer 222 can be deposited onto the surface 212 of the metallic substrate 210 using a chemical vapor deposition (CVD) process, a plasma-enhanced CVD (PECVD) process, or an electroplating process. For example, a CVD process may be particularly suitable when the first layer 222 is TiN, DLC, MeDLC, or CrN. With such an application process, the first thickness 223 may be greater than or equal to about 0.25 micron and less than or equal to about 12.0 microns. For example, the first thickness 223 may be greater than or equal to about 2 microns and less than or equal to about 10 microns. In some examples, the first layer 222 can be deposited onto the surface 212 of the metallic substrate 210 using a plasma-enhanced CVD (PECVD) process. A benefit of using a PECVD process is that the coating material can be deposited onto the substrate 210 at a lower temperature than that of a standard CVD process. For example, substrates are heated to approximately 600-800° C. during a CVD process, whereas substrates are heated to approximately 250-300° C. during a PECVD process. Therefore, when substrates with relatively low maximum temperature limits are used, such as alloy steel 9310, it may be beneficial to use a PECVD process, as opposed to a standard CVD process.

An electroplating process may be particularly suitable when the first layer 222 is hard chromium or TDC. With such an application process, the first thickness 223 may be greater than or equal to about 1.2 microns and less than or equal to about 15 microns. For example, the first thickness 223 may be greater than or equal to about 2 microns and less than or equal to about 10 microns, such equal to about 2.5 microns.

The coating 220 may be applied to a relatively rough substrate. For example, the coating 220 may be applied to the component 100 as ground, before peening. Additionally, certain finishing operations, such as glass beading, ceramic, or vibratory superfinishing may be unnecessary prior to the coating 220 being applied.

The second layer 224 can include a disulfide. For example, the second layer 224 can include tungsten disulfide (WS2) or molybdenum disulfide (MoS2), which are solid lubricants. A solid lubricant is a solid material that lowers the friction or wear between two contacting surfaces in relative motion. Reducing the friction or wear between two contacting surfaces in relative motion can reduce the heat generated. Therefore, applying the second layer 224 to the component 100, such as the gear 200, can reduce the amount of heat generated by the system that it is installed on, when the system is operational.

The second layer 224 can be deposited onto the first layer 222 using a spray blasting process. For example, WS2 or MoS2 powder can be propelled against the surface 212 of the metallic substrate 210 at a high velocity to adhere to the substrate. With such an application process, the second thickness 225 may be greater than or equal to about 0.2 micron and less than or equal to about 10.0 microns, for example, greater than or equal to about 3 microns and less than or equal to about 7 micron, such as equal to about 5 microns. In some examples, the coating 220 does not include a first layer 222. If a first layer 222 is not applied, the second layer 224 is deposited directly onto the substrate.

It will be appreciated, however, that in other exemplary embodiments, the first and second layer 222, 224 may additionally or alternatively be applied in any suitable manner using any suitable process.

Figure 4:
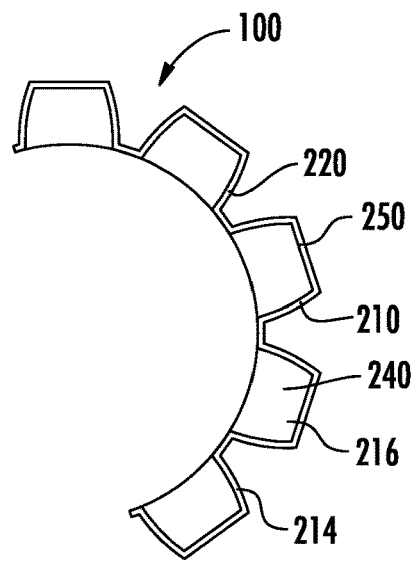
FIG. 4 is a partial, side-view of the component of FIG. 2 in accordance with an exemplary embodiment of the present disclosure.

Referring now to FIG. 4, a partial, side-view of the component 100 of FIG. 2 is shown, in accordance with an exemplary embodiment of the present disclosure. In this example, the component 100 has the coating 220, as described in reference to FIG. 3, disposed on the entire surface 212 of the component 100. For example, the coating 220 is disposed on tribological surfaces 214 and non-tribological surface 216.

In other examples, the coating 220 is only disposed on tribological surfaces 214. For example, with such a configuration the non-tribological surfaces 216 may be masked-off prior to the application of the coating 220 to avoid applying the coating 220 onto the non-tribological surfaces 216. For example, the coating 220 can be applied to the portions of the gear 200, such as gear teeth 250, that make contact with another gear, whereas the coating 220 is not applied to the portions of the gear 200 that do not make contact with another gear, such as the sides 240 (runs parallel with the paper in FIG. 4) of the gear 200.

In yet another example, the first layer 222 of the coating 220 may be applied to the entire surface of the component 100, whereas the second layer 224 of the coating may be selectively applied to only a portion of the component 100. For example, the first layer 222 and the second layer 224 can be applied to the tribological surfaces 214 of the component 100, whereas the non-tribological surfaces 216 may only include the first layer 222 of the coating 220.

In certain scenarios, masking off certain areas, such as non-tribological surfaces 216, may be time-consuming and costly. Therefore, even though more coating material is used, which can be costly, the labor and time costs of masking-off certain areas may be greater than the material costs. As such, a reduction in cost and lead-time may be realized by depositing the coating 220 onto the entire surface 212 of the component 100. Yet in other examples, it may be beneficial to only apply the coating 220 to certain areas of the component 100, such as tribological surfaces 214, because the material costs of the coating are greater than the labor and time costs associated with masking-off non-tribological surfaces 216.

Figure 5:
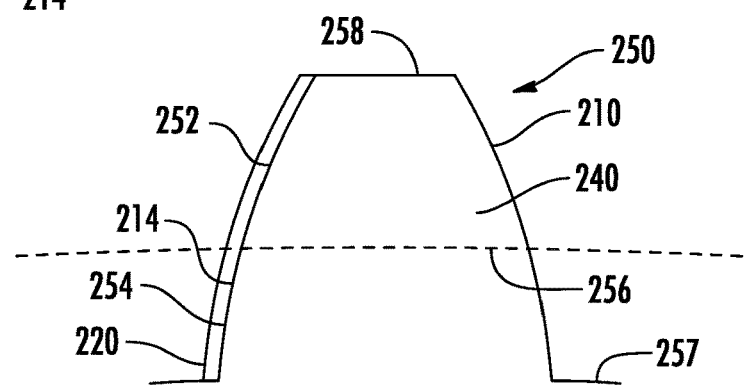
FIG. 5 is a side-view of a portion of the component of FIG. 2 in accordance with an exemplary embodiment of the present disclosure.

Referring now to FIG. 5, a side-view of a portion of the component 100 of FIG. 2 is shown, in accordance with an exemplary embodiment of the present disclosure. In this example, the component 100 is a spur gear, and the shown portion is a gear tooth 250. More specifically, the exemplary gear 200 depicted includes a gear tooth 250 that has a face 252, a flank 254, a bottom land 257, and a top land 258. A "pitch circle", such as pitch circle 256, is an imaginary circle that is concentric with a gear's axis of rotation, is within the profile of the gear's teeth, and rotates against another pitch circle of a meshing gear. The flank 254 of the tooth is the portion of the tooth's meshing surface that lies within the gear's pitch circle 256, the face 252 of the tooth is the portion of the tooth's meshing surface that lies outside of the gear's pitch circle 256.

As shown, the coating 220 is selectively applied to only a portion of the gear 200. The coating 220 is applied only to the flank 254 and the face 252 of the gear tooth 250, and the top land 258 remains uncoated. It will be appreciated, however that in another example, the coating 220 may be applied to the face 252, flank 254, a bottom land 257, and a top land 258 of the gear 200, and the sides 240 (runs parallel with the paper in FIG. 5) of the gear 200 may remain uncoated. Stated a different way, with such an example embodiment, the coating 220 may be applied to the meshing surfaces of the gear 200, whereas the coating 220 is not applied to the non-meshing surfaces. A "meshing surface" is the portion of the gear that includes gear teeth, whereas the non-meshing surface is the portion of the gear that does not include gear teeth.

Figure 6:
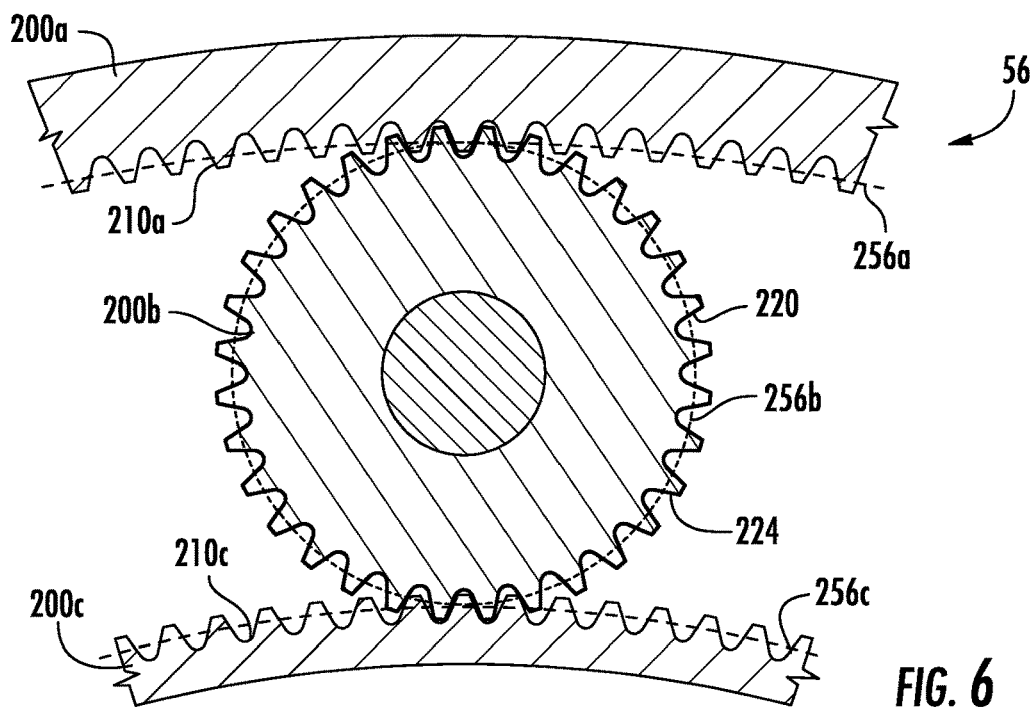
FIG. 6 is a side-view of a portion of a reduction gearbox in accordance with an exemplary embodiment of the present disclosure.

Referring now to FIG. 6, a side-view of a portion of a reduction gearbox 56 is shown, in accordance with an exemplary embodiment of the present disclosure. In this example, the reduction gearbox 56 includes a ring gear 200a, a plurality of planetary gears 200b (only one shown for simplicity), and a sun gear 200c. The ring gear 200a can define a pitch circle 256a, each of the plurality of planetary gears 200b can define a pitch circle 256b, and the sun gear 200c can define a pitch circle 256c. The reduction gearbox 56 of FIG. 6 can include a planetary gear set, also known as an epicyclic gear set, which is common in the art.

In this example, each of the planetary gears 200b are coated with the second layer 224, whereas the ring gear 200a and the sun gear 200c do not include a first layer 222 or a second layer 224. In another example, each of the planetary gears 200b are coated with the first layer 222 and the second layer 224, whereas the ring gear 200a and the sun gear 200c do not include a first layer 222 or a second layer 224. In this way, the metallic substrate 210a of the ring gear 200a contacts the second layer 224 of the planetary gear 200b. Also, the metallic substrate 210c of the sun gear 200c contacts the second layer 224 of the planetary gear 200b.

The second layer 224 of coating 220 can be applied to a gear, such as planetary gear 200b, within a gearbox to protect uncoated gears, such as ring gear 200a and sun gear 200c, that mesh with the coated gear.

For example, the hardness of the second layer 224 is less than the hardness of the first layer 222. As such, less abrasion and scoring is experienced by the uncoated meshing gear, such as ring gear 200a or sun gear 200c, when the second layer 224 is disposed on top of the first layer 222. In contrast, if only the first layer 222 is applied, without the second layer 224, an uncoated gear meshing with the coated gear 200 may experience increased abrasion and scoring due to the relative hardness of the first layer 222.

Additionally, because the second layer 224 can protect an uncoated gear meshing with the coated gear, it may be unnecessary to coat all gears within a gearbox. Also, it may be beneficial, due to reduced lead times and costs, to coat only some, but not all gears within a gearbox. Therefore, gears that experience the most amount of friction or heat within a gearbox can be coated with the first layer 222 and the second layer 224, or with just the second layer 224, whereas gears that experience the least amount of friction or heat within a gearbox can remain uncoated and do not include a first layer or a second layer 224. In this way, the second layer 224 of the coated gear contacts the substrate of the uncoated gear within the gearbox. More specifically, the second layer 224 of the coated gear directly contacts the substrate of the uncoated gear at the locations where the coated gear and the uncoated gear mesh with each other, for example, at the tribological surfaces, i.e., locations where the gear teeth are located.

In one example, gears that experience pitch circle velocities, or pitch line velocities, above approximately 25 m/s, such as above 30 m/s or above 35 m/s, can be coated with the first layer 222 and the second layer 224 or with only the second layer 224, and the remaining gears can remain uncoated. As used herein, a pitch circle velocity is the velocity of a gear measured at its pitch circle. As another example, gears that experience pressures above approximately 1.5 GPa, such as above 2 GPa or above 2.5 GPa, can be coated with the first layer 222 and the second layer 224 or with only the second layer 224, and the remaining gears can remain uncoated. In yet another example, gears that experience temperatures, during normal operation, above approximately 150° C., such as above 160° C. or above 170° C., can be coated with the first layer 222 and the second layer 224 or with only the second layer 224, and the remaining gears can remain uncoated. In still yet another example, gears that experience temperatures, during normal operation, above approximately 100° C., such as above 130° C. or above 160° C., can be coated with the first layer 222 and the second layer 224 or with only the second layer 224, and the remaining gears can remain uncoated. This selective application of the coating 220 can reduce lead times or costs.

With the use of the coating 220 onto certain components of a gearbox, such as reduction gearbox 56, the amount of lubricant provided to the gearbox can be reduced. The coating 220 can reduce the amount of friction experienced by the gear 200. As such, less heat is generated and, therefore, less lubricant is needed to provide cooling to the gear 200. Because less lubricant is needed, the sump size can be reduced and the amount of lubricant on board the aircraft or engine can be reduced, which reduces weight.

As mentioned, when the gear 200 is operating within a gearbox, a lubricant can be provided to the gear 200 to reduce the friction between the gear 200 and the other gear that it is meshing with, and to also cool the gear 200. During normal operating conditions, the lubricant can provide sufficient friction protection and cooling to the gear 200. However, the flow of lubricant to the gearbox that the gear 200 is installed within can be interrupted during a loss of lubricant event. During a loss of lubricant event, the flow of lubricant is reduced or ceased, but it may be necessary for the gear 200 to remain operational for a specific amount of time. For example, it may be necessary for the gear 200 to remain operational for at least thirty minutes after a loss of lubricant event. The coating 220 can be applied to at least a portion of the gear 200, such as tribological surfaces 214, to increase the amount of time that the gear 200 remains operational during a loss of lubricant event. Additionally, applying the coating 220 to at least a portion of the gear 200 may eliminate the need to include an emergency oil system, which can reduce the weight of the engine that the gear is installed on.

Applying a second layer 224 on top of a first layer 222 can protect the first layer 222 until it is needed most, during certain operating conditions. For example, when the first layer 222 and the second layer 224 are applied to a gear, such as gear 200b of FIG. 6, the second layer 224 can remain intact during normal operations, which can protect uncoated gears, such as gear 200a and gear 200b, that it is meshing with. During certain conditions, such as a loss of lubrication event, the second layer 224 may be worn off of the coated gear, such as gear 200b, exposing the first layer 222. The first layer 222 can be more durable and can withstand the higher temperatures that are experienced during loss of lubrication events. As such, the first layer 222 can remain intact during loss of lubrication events and can protect the underlying metallic substrate 210 and can increase the amount of time that the gearbox remains operational due to its ability to reduce friction and heat.

Figure 7:
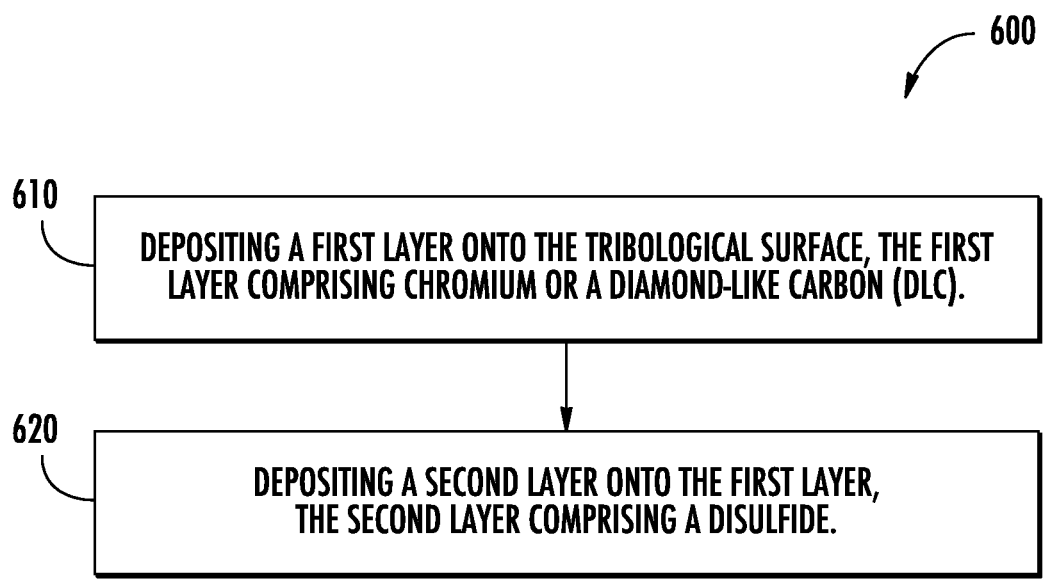
FIG. 7 is a flow chart showing a method for depositing a coating onto a metallic substrate in accordance with an exemplary embodiment of the present disclosure.

Referring now to FIG. 7, a flow chart showing a method 600 for depositing a coating 220 onto a metallic substrate 210 having a tribological surface 214 is shown, in accordance with an exemplary embodiment of the present disclosure. The metallic substrate 210 can include a carburized or a nitrided steel. For example, the metallic substrate 210 can include 9310 alloy steel, X53 alloy steel, or M50 alloy steel, to name a few.

The method 600 includes a step 610 of depositing a first layer 222 onto the tribological surface 214, the first layer 222 including titanium, chromium, or a diamond-like carbon (DLC). For example, the first layer 222 can include DLC, metal-doped DLC, titanium nitride (TiN), or chromium nitride (CrN). As another example, the first layer 222 can include hard chromium or TDC.

The step 610 can include depositing the first layer 222 onto the tribological surface 214 using a CVD process, such as a PECVD process. As another example, the step 610 can include depositing the layer onto the tribological surface 214 using an electroplating process. The step 610 can further include depositing the first layer 222 onto a non-tribological surface 216 of the metallic substrate 210.

The method 600 further includes a step 620 of depositing a second layer 224 onto the first layer 222, the second layer 224 including a disulfide. For example, the second layer 224 can include tungsten disulfide or molybdenum disulfide. The step 620 can include depositing the second layer 224 onto the first layer 222 by using a spray blasting process.

Even though the present disclosure has been described in relation to the spur gear 200 of FIG. 2, it should be understood that the described coating 220 can be applied to other types of gears, for example, helical gears and bevel gears. It should be further understood that the described coating 220 can be applied to other components that include tribological surfaces 214, for example, valves, bearings, and pistons.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. A component comprising a metallic substrate having a tribological surface, and a coating comprising a first layer disposed on the tribological surface, the first layer comprising titanium, chromium, or a DLC, and a second layer disposed on the first layer, the second layer comprising a disulfide.
2. The component of any preceding clause, wherein the first layer comprises a metal-doped DLC (MeDLC).
3. The component of any preceding clause, wherein the first layer comprises titanium nitride (TiN), chromium nitride (CrN), hard chromium, or thin dense chrome (TDC).
4. The component of any preceding clause, wherein the second layer comprises tungsten disulfide or molybdenum disulfide.
5. The component of any preceding clause, wherein the metallic substrate has a non-tribological surface, wherein the first layer is further disposed on the non-tribological surface.

6. The component of any preceding clause, wherein the metallic substrate comprises a carburized or a nitrided steel.
7. The component of any preceding clause, wherein the metallic substrate comprises 9310 alloy steel.
8. The component of any preceding clause, wherein the component is a gear.
9. A method for depositing a coating onto a metallic substrate having a tribological surface, the method comprising depositing a first layer onto the tribological surface, the first layer comprising titanium, chromium, or a DLC, and depositing a second layer onto the first layer, the second layer comprising a disulfide.
10. The method of any preceding clause, wherein the first layer comprises titanium nitride (TiN), metal-doped DLC, or CrN.
11. The method of any preceding clause, wherein depositing the first layer onto the tribological surface includes using a CVD process.
12. The method of any preceding clause, wherein depositing the first layer onto the tribological surface includes using a PECVD process.
13. The method of any preceding clause, wherein the first layer comprises hard chromium or TDC.
14. The method of any preceding clause, wherein the second layer comprises tungsten disulfide or molybdenum disulfide.
15. The method of any preceding clause, wherein depositing the second layer onto the first layer includes using a spray blasting process.
16. The method of any preceding clause, further comprising depositing the first layer onto a non-tribological surface of the metallic substrate.
17. The method of any preceding clause, wherein the metallic substrate comprises a carburized or a nitrided steel.
18. The method of any preceding clause, wherein the metallic substrate comprises 9310 alloy steel.
19. A gearbox comprising a first gear comprising a metallic substrate having a tribological surface and a coating, the coating comprising a disulfide.
20. The gearbox of any preceding clause, wherein the coating comprises a first layer comprising titanium, chromium, or a diamond-like carbon (DLC), and a second layer disposed on the first layer, the second layer comprising the disulfide.
21. The gearbox of any preceding clause, further comprising a second gear comprising a metallic substrate having a tribological surface, the second gear meshing with the first gear, wherein the coating of the first gear contacts the metallic substrate of the second gear.
22. The gearbox of any preceding clause, wherein the coating comprises a first layer comprising titanium, chromium, or a diamond-like carbon (DLC), and a second layer disposed on the first layer, the second layer comprising the disulfide.

We claim:

1. A component comprising:
a metallic substrate having a tribological surface; and
a coating comprising:
a first layer disposed on the tribological surface, the first layer comprising chromium nitride (CrN), hard chromium, thin dense chrome (TDC) or chromium, wherein the first layer has a thickness of 0.25 microns to 12 microns; and
a second layer disposed on the first layer, the second layer comprising a disulfide.

2. The component of claim 1, wherein the second layer comprises tungsten disulfide or molybdenum disulfide.

3. The component of claim 1, wherein the metallic substrate has a non-tribological surface, wherein the first layer is further disposed on the non-tribological surface.

4. The component of claim 1, wherein the metallic substrate comprises a carburized or a nitrided steel.

5. The component of claim 1, wherein the component is a gear.

6. The component of claim 1, wherein the second layer has a second thickness of 0.2 microns to 10.0 microns.

7. A gearbox comprising:
a first gear comprising a metallic substrate having a tribological surface and a coating, the coating comprising a first layer disposed on the tribological surface and a second layer disposed on the first layer, wherein the first layer comprises chromium nitride (CrN), hard chromium, thin dense chrome (TDC) or chromium, and wherein the first layer has a thickness of 0.25 microns to 12 microns, and wherein the second layer comprises a disulfide.

8. The gearbox of claim 7, further comprising:
a second gear comprising a metallic substrate having a tribological surface, the second gear meshing with the first gear,
wherein the coating of the first gear contacts the metallic substrate of the second gear.

* * * * *